(12) United States Patent
Yoshikawa et al.

(10) Patent No.: US 7,789,417 B2
(45) Date of Patent: Sep. 7, 2010

(54) OCCUPANT RESTRAINING DEVICE

(75) Inventors: Hiromichi Yoshikawa, Tokyo (JP);
Kimihiro Koshikawa, Tokyo (JP)

(73) Assignee: Takata Corporation, Tokyo (JP)

( * ) Notice: Subject to any disclaimer, the term of this patent is extended or adjusted under 35 U.S.C. 154(b) by 52 days.

(21) Appl. No.: 12/091,311

(22) PCT Filed: Oct. 23, 2006

(86) PCT No.: PCT/JP2006/321025

§ 371 (c)(1),
(2), (4) Date: Apr. 24, 2008

(87) PCT Pub. No.: WO2007/049538

PCT Pub. Date: May 3, 2007

(65) Prior Publication Data
US 2009/0096198 A1    Apr. 16, 2009

(30) Foreign Application Priority Data
Oct. 28, 2005   (JP)   ............................ 2005-314857

(51) Int. Cl.
*B60R 21/16*   (2006.01)
(52) U.S. Cl. .................................... 280/730.1
(58) Field of Classification Search .............. 280/730.1, 280/743.1
See application file for complete search history.

(56) References Cited

U.S. PATENT DOCUMENTS

| | | | | | |
|---|---|---|---|---|---|
| 4,623,192 A | * | 11/1986 | Koide et al. | ............ | 297/284.11 |
| 5,316,337 A | * | 5/1994 | Yamaji et al. | ............ | 280/743.1 |
| 5,584,508 A | * | 12/1996 | Maruyama et al. | ....... | 280/743.1 |
| 5,664,805 A | * | 9/1997 | Yoshida et al. | ........... | 280/743.1 |
| 6,145,879 A | * | 11/2000 | Lowe et al. | ............... | 280/743.1 |
| 6,752,454 B2 | * | 6/2004 | Ruel et al. | ............... | 297/216.1 |

(Continued)

FOREIGN PATENT DOCUMENTS

DE     199 44 052      3/2000

(Continued)

OTHER PUBLICATIONS

An International Search Report dated Jan. 9, 2007, from the International Bureau in corresponding International (PCT) Application No. PCT/JP2006/321025.

*Primary Examiner*—Faye M. Fleming
(74) *Attorney, Agent, or Firm*—Fitch, Even, Tabin & Flannery (57) ABSTRACT

An occupant restraining device that can maintain the internal pressure of a bag at a high level is provided. In one form, a bag has its left and right ends both provided with stationary sections that are fixed to a seat pan. The stationary sections have therebetween a gas chamber that is inflated as a result of gas entering from an inflator. The bag is made into the form of a pouch by stacking an upper panel and a lower panel one on top of the other, which are to respectively define an upper half and a lower half of an outer periphery surface of the bag in an inflated state, and then bonding and sewing these panels together along the edges thereof. Specifically, the bonding of these panels together along the edges thereof involves the use of elastic adhesive having a stretchability of 200% or more, for example, between 200% and 400%.

13 Claims, 12 Drawing Sheets

U.S. PATENT DOCUMENTS

| | | | |
|---|---|---|---|
| 6,905,134 B2* | 6/2005 | Saiguchi et al. | 280/730.1 |
| 7,032,926 B2* | 4/2006 | Ruel | 280/743.1 |
| 7,527,333 B2* | 5/2009 | Suzuki et al. | 297/216.1 |
| 7,549,674 B2 | 6/2009 | Yoshikawa et al. | |
| 2002/0020992 A1* | 2/2002 | Kanuma | 280/730.2 |
| 2002/0074784 A1 | 6/2002 | Mishima et al. | |
| 2004/0070184 A1 | 4/2004 | Takahara | |
| 2007/0132213 A1* | 6/2007 | Suzuki et al. | 280/730.1 |
| 2007/0132214 A1* | 6/2007 | Suzuki et al. | 280/730.1 |
| 2007/0246919 A1* | 10/2007 | Kai | 280/730.1 |

FOREIGN PATENT DOCUMENTS

| | | |
|---|---|---|
| EP | 1 479 570 | 11/2004 |
| GB | 2 399 795 | 9/2004 |
| JP | 52 5126 | 1/1977 |
| JP | 10 217818 | 8/1998 |
| JP | 2001 1854 | 1/2001 |
| JP | 2003 72504 | 3/2003 |
| JP | 2005 29102 | 2/2005 |
| JP | 2005 67465 | 3/2005 |
| JP | 2005-255148 A | 9/2005 |

* cited by examiner

OCCUPANT RESTRAINING DEVICE

CROSS-REFERENCE TO RELATED APPLICATION

This application is a U.S. national phase application filed under 35 U.S.C. §371 of International Application PCT/JP2006/321025, filed on Oct. 23, 2006, designating the United States, which claims priority from Japanese Patent Application No. 2005-314857, filed on Oct. 28, 2005, which are hereby incorporated herein by reference in their entirety.

FIELD OF THE INVENTION

The present invention relates to an occupant restraining device for restraining an occupant in a seat of a vehicle, such as an automobile, during a collision, and particularly, to an occupant restraining device that restrains an occupant's waist during a frontal collision in order to prevent the occupant's body from moving forward and downward.

BACKGROUND ART

As a system for restraining a vehicle occupant during a collision, an occupant restraining device that prevents a so-called submarine phenomenon is known. Specifically, a submarine phenomenon occurs when an occupant wearing a seatbelt slips through a space below a lap belt during a frontal collision. Japanese Unexamined Patent Application Publication No. 10-217818 discloses an occupant restraining device having an inflatable bag disposed between a seat cushion and a seat pan. When a vehicle is involved in a collision, the bag inflates and pushes the front portion of the seat cushion upward.

Figure 7:
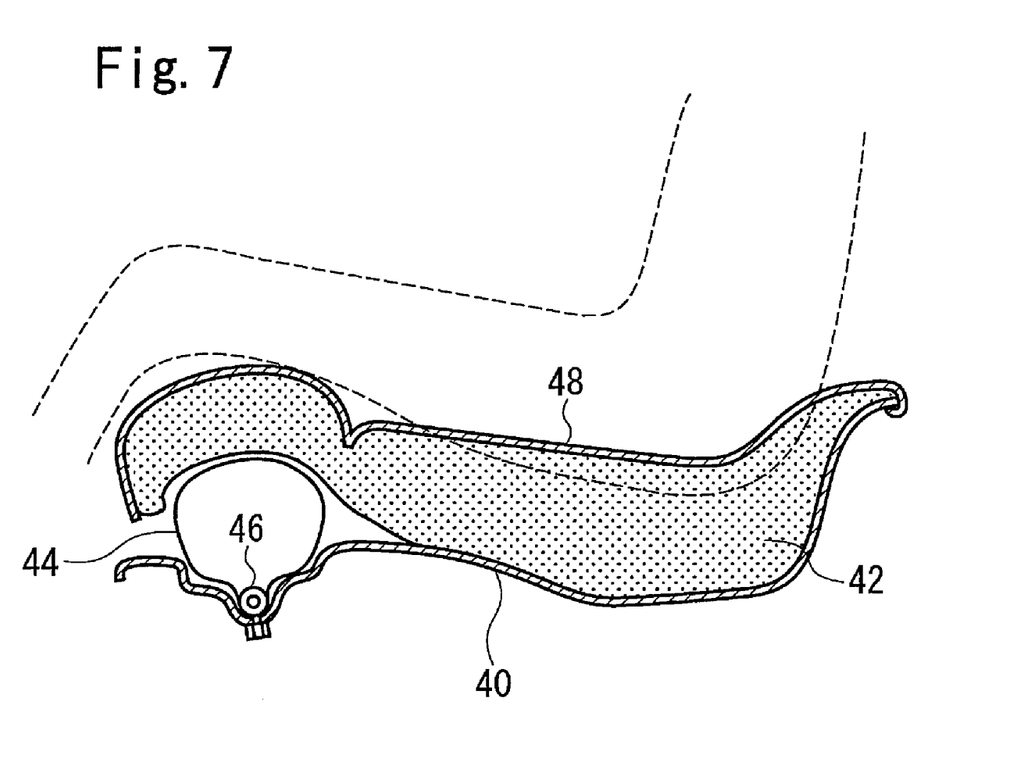
FIG. 7 is a longitudinal sectional view of an occupant restraining device of related art as viewed in a front-back direction of a seat.

FIG. 7 is a longitudinal sectional view of the occupant restraining device of Japanese Unexamined Patent Application Publication No. 10-217818 as viewed in a front-back direction of a seat. At the front portion of the seat, an airbag 44 is disposed between a cushion frame (seat pan) 40 and a seat pad 42. The airbag 44 extends in a left-right width direction of the seat and can be inflated by an inflator 46. The upper surface of the seat pad 42 is covered with a trim cover 48 on which an occupant can be seated.

When the inflator 46 is actuated in response to a collision of the vehicle, the airbag 44 is inflated, causing the front portion of the seat pad 42 to be pushed upward or to be thrust upward from below. This increases the density, thereby preventing (including suppressing) forward movement of the occupant's body.

Such an airbag 44 is typically formed by stacking two sheets of woven fabric one on top of the other and sewing the two together along the edges thereof.

SUMMARY OF THE INVENTION

A first object of the present invention is to provide an occupant restraining device that can maintain the internal pressure of the bag at a high level.

A second object of the present invention is to increase the production efficiency of the bag.

A third object of the present invention is to reduce anisotropy in the stretchability of the bag formed of woven fabric.

An occupant restraining device according to a first aspect includes an inflatable bag capable of pushing a seat cushion from below; and a gas generator that inflates the bag when a vehicle is in an emergency situation. The bag includes a plurality of stacked panels disposed above and below a chamber into which gas is introduced.

An occupant restraining device according to a second aspect includes an inflatable bag capable of pushing a seat cushion from below; and a gas generator that inflates the bag when a vehicle is in an emergency situation. The bag includes a plurality of panels that are stacked and connected together so that a chamber into which gas is introduced is formed between the panels. At least a part of the connection is bonded using elastic adhesive having a stretchability of 200% or more.

In the second aspect, the connection may include a combination of the bonding with the adhesive and sewing of the bonded part.

An occupant restraining device according to a third aspect includes an inflatable bag capable of pushing a seat cushion from below; and a gas generator that inflates the bag when a vehicle is in an emergency situation. The bag includes a plurality of panels that are stacked and connected together so that a chamber into which gas is introduced is formed between the panels. Each of the panels is formed of a woven fabric, and a weave direction of at least a portion of one of the panels is biased with respect to a weave direction of at least a portion of another one of the panels.

In the third aspect, the bag may include a plurality of stacked panels disposed above and below the chamber into which gas is introduced.

In the third aspect, the panels may include two panels disposed above the chamber and two panels disposed below the chamber. In this case, the weave directions of the vertically adjacent panels may differ from one another by 40° to 50°.

DETAILED DESCRIPTION OF THE PREFERRED EMBODIMENTS

As in the first aspect, the upper and lower panels are constituted by a plurality of sheets of panels, whereby the stretchability can be dispersedly distributed over the panels. Accordingly, this can enhance the tolerance of the bag as well as maintaining the internal pressure of the bag at a high level. In addition, this multiple-panel-sheet configuration also allows for less leakage of gas through the panels.

As in the second aspect, by bonding the panels together with elastic adhesive having a stretchability of 200% or more, the amount of gas leakage can be reduced. For example, even through the adhesive may become ruptured and detached as the bag inflates, application of the adhesive over a sufficiently large area can allow the inflation to be completed just before the edges of the panels. Thus, the bag can be formed by simply bonding the panels together. The peel strength of the panels bonded together may be set higher than or equivalent to a normal seam strength such that the adhesive applied along the edges of the inflatable portion does not become completely ruptured or detached at the time of inflation. Thus, the bag body can be formed with only the adhesive. In that case, since the bag can be formed by simply bonding the panels together, the productivity thereof is significantly increased.

By sewing the adhesive-bonded part, the strength of the bag can be further increased.

According to the third aspect, a force imparted on the bag upon inflation of the bag can be dispersed, thereby achieving substantially uniform stretchability.

Figure 1:
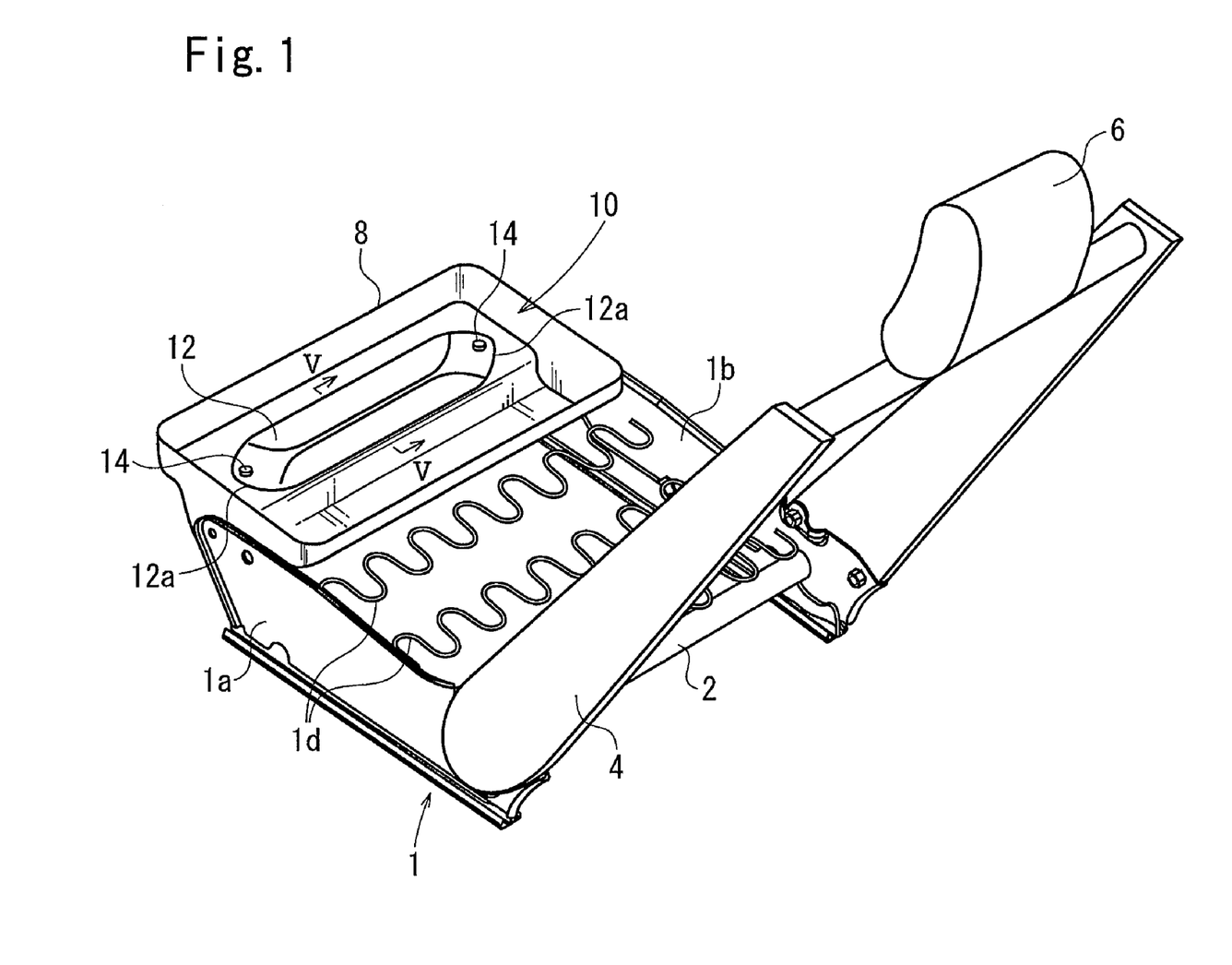
FIG. 1 is a perspective view showing a non-inflated state of a bag in an occupant restraining device according to an embodiment, which is installed in a frame of a seat.
Figure 2:
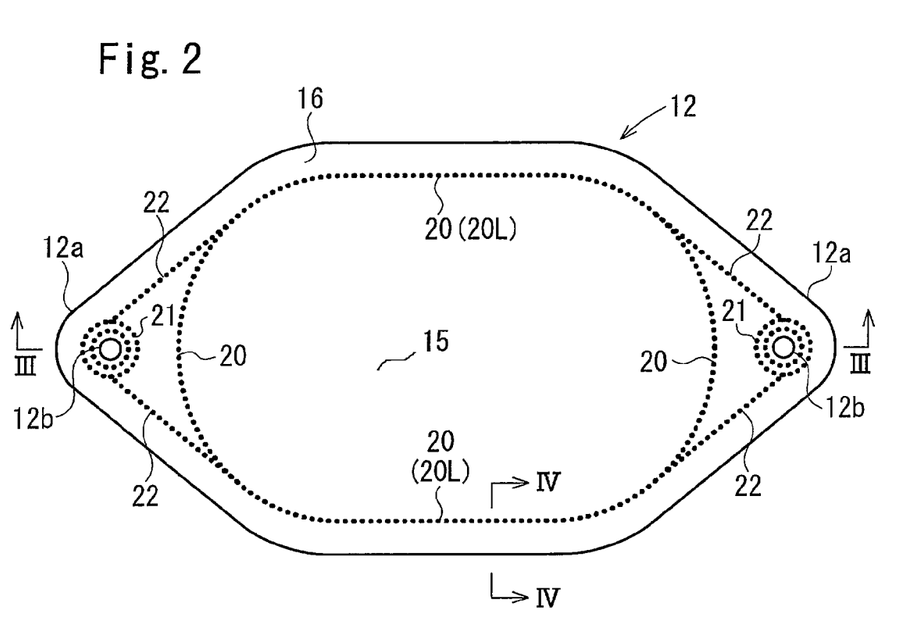
FIG. 2 is a plan view of the bag.
Figure 3:
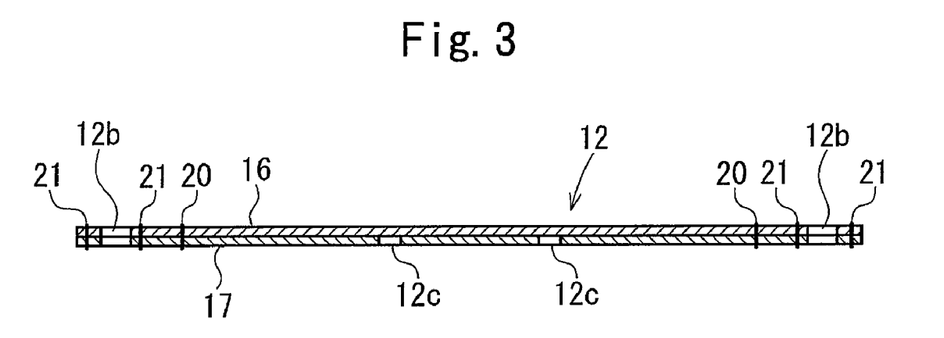
FIG. 3 is a cross-sectional view taken along line III-III in FIG. 2.
Figure 4:
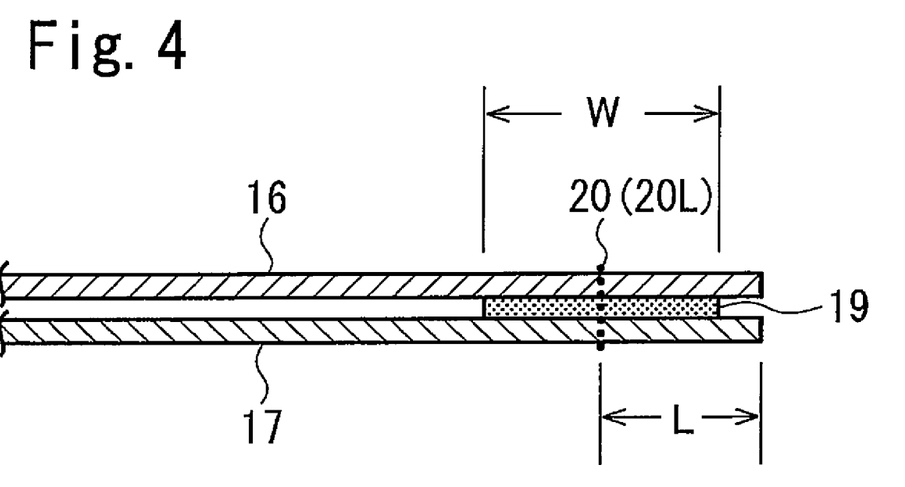
FIG. 4 is a cross-sectional view taken along line IV-IV in FIG. 2.
Figure 5:
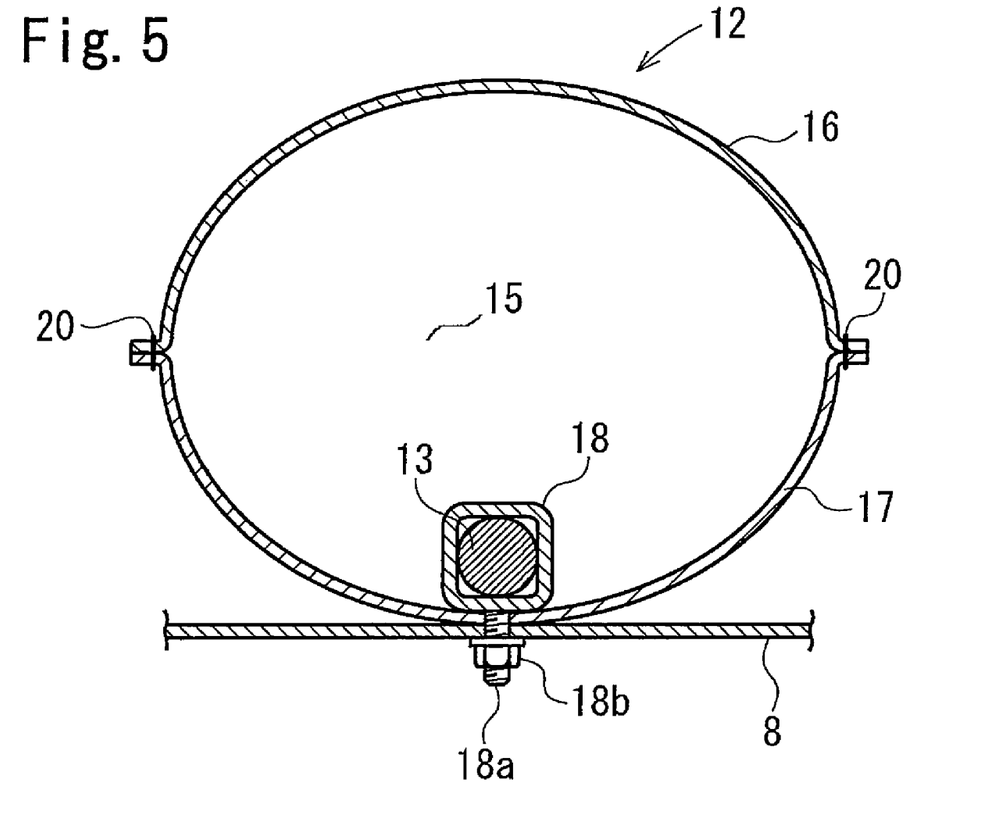
FIG. 5 is a cross-sectional view taken along line V-V in FIG. 1 and shows the bag in an inflated state.

Embodiments of the present invention will be described below with reference to the drawings. FIG. 1 is a perspective view showing a non-inflated state of a bag in an occupant restraining device according to an embodiment of the present invention, which is installed in a frame of a seat. FIG. 2 is a plan view of the bag in FIG. 1. FIG. 3 is a cross-sectional view taken along line III-III in FIG. 2. FIG. 4 is a cross-sectional view taken along line IV-IV in FIG. 2. FIG. 5 is a cross-sectional view taken along line V-V in FIG. 1 and shows the bag in an inflated state.

A frame constituting a seat of a vehicle includes a base frame 1 and a back frame 4 rotatably connected with the base frame 1 by means of a support shaft 2 and a reclining device (not shown). An upper portion of the back frame 4 has a headrest 6 attached thereto. The base frame 1 has left and right side frames 1a and 1b. Front portions of these side frames 1a and 1b have a seat pan 8 bridged therebetween.

Although not shown in the drawings, the base frame 1 and the back frame 4 respectively have mounted thereon a seat cushion and a seat back made of, for example, urethane. The seat pan 8 is disposed below a front portion of the seat cushion. In FIG. 1, reference numeral 1d denotes springs that support the seat cushion.

An occupant restraining device 10 includes an inflatable bag 12 disposed above the seat pan 8 and capable of pushing the front portion of the seat cushion from below, and an inflator (gas generator) 13 for inflating the bag 12. The bag 12 extends in the left-right direction (vehicle-width direction) of the seat pan 8. Both ends of the bag 12 in the left-right direction are respectively provided with stationary sections 12a and 12a fixed to the seat pan 8. Each stationary section 12a is fixed to the seat pan 8 with a bolt 14. The stationary sections 12a and 12a of the bag 12 have therebetween a gas chamber 15 that is inflated as a result of gas entering from the inflator 13.

In this embodiment, the bag 12 is made into the form of a pouch by stacking an upper panel 16 and a lower panel 17 one on top of the other, which are to respectively define an upper half and a lower half of an outer periphery surface of the bag 12 in an inflated state, and then bonding and sewing these panels together along the edges thereof. Specifically, the bonding of these panels together along the edges thereof involves the use of elastic adhesive 19 having a stretchability of 200% or more, for example, between 200% and 400%. Reference numerals 20 to 22 denote seams defined by, for example, threads used for sewing the panels 16 and 17 together. A seam 20 extends circumferentially around the panels 16 and 17 so as to surround the gas chamber 15.

As shown in FIG. 2, in this embodiment, each of the panels 16 and 17 has a substantially hexagonal, horizontally-oblong shape in plan view such that a pair of opposite edges thereof extends in the left-right direction. Each panel 16, 17 has substantially triangular protruding sections at both the left and right ends thereof. These substantially triangular protruding sections define the stationary sections 12a to be fixed to the seat pan 8. Near the tip of each protruding section is provided a through-hole 12b for the corresponding bolt 14. A central area of the lower panel 17 is provided with stud-bolt through-holes 12c through which stud bolts 18a of a retainer 18 to be described below extend.

The panels 16 and 17 are sewn together along the seam 20 that extends entirely along the periphery of an area between the stationary sections 12a and 12a, whereby the gas chamber 15 is formed between the stationary sections 12a and 12a. As shown in FIG. 2, the seam 20 has a substantially oval shape that is horizontally oblong.

In detail, the seam 20 has a pair of left-right-direction extending segments (indicated with reference numeral 20L in FIG. 2) extending in the left-right direction respectively along the pair of opposite edges of each panel 16, 17, and a pair of substantially circular-arc segments (not given reference numerals) connecting first ends together and second ends together of the left-right-direction extending segments. The pair of substantially circular-arc segments extends in the form of a substantially circular arc so as to be convex towards the respective left and right ends of each panel 16, 17.

As shown in FIG. 4, a distance L from the edge of the panels 16 and 17 to each left-right-direction extending segment 20L of the seam 20 is set to 15 mm or more, and is preferably about, for example, 15 mm to 30 mm. In particular, the distance L is preferably set to about 20 mm.

An adhesion width W of the elastic adhesive 19 is preferably about 7 to 15 mm. The seam 20 is preferably located within a range of ±3 mm from the center of the elastic adhesive 19 in the width direction thereof.

The peripheries of the aligned bolt through-holes 12b of the panels 16 and 17 are sewn together along corresponding seams 21. On the other hand, the peripheries of the left-side stationary sections 12a and 12a of the respective panels 16 and 17 are sewn together along a seam 22, and likewise, the peripheries of the right-side stationary sections 12a and 12a of the respective panels 16 and 17 are sewn together along another seam 22. As shown in FIG. 2, each of the seams 22 has its opposite ends merged with the seam 20 and has its intermediate segment merged with the corresponding seam 21.

In this embodiment, the inflator 13 having the shape of a rod is disposed within the bag 12. The inflator 13 extends longitudinally in the vehicle-width direction. The inflator 13 has gas discharge nozzles (not shown) on a periphery surface thereof, and radially discharges gas through these gas discharge nozzles.

As shown in FIG. 5, the inflator 13 has the retainer 18 connected thereto for fixing the inflator 13 to the seat pan 8. The retainer 18 has the stud bolts 18a projecting therefrom. The stud bolts 18a extend through the stud-bolt through-holes 12c provided in the lower face (the lower panel 17) of the bag 12 so as to protrude outward from the bag 12. As shown in the drawing, each stud bolt 18a extends through a stud-bolt through hole (not given a reference numeral) in the seat pan 8, and a nut 18b is fastened to the stud bolt 18a at the underside (lower side) of the seat pan 8. Thus, the retainer 18 and the inflator 13 are fixed together to the seat pan 8, and the central area of the bag 12 in the left-right direction is securely held between the retainer 18 and the seat pan 8.

The bag 12 is folded so as to be laid flat on the upper surface of the seat pan 8 and to have a small width in the front-back direction. Specifically, the bag 12 may be folded after being attached to the seat pan 8, or may be preliminarily folded. In the latter case, the preliminarily folded bag 12 may be attached to the seat pan 8 while retaining the shape thereof with a shape-retaining member (not shown).

In this embodiment, the bag 12 is first laid flat, and an anterior side and a posterior side of the bag 12 with respect to the central area thereof in the front-back direction of the seat are folded towards the center, thereby reducing the width of the bag 12 in the front-back direction. However, the method of folding the bag 12 is not limited to the above. Alternatively, the bag 12 may be folded multiple times in a zigzag fashion (accordion-folded) or may be folded in a rolled-up manner. As a further alternative, the bag 12 may be disposed flatly without being folded.

The occupant restraining device 10 operates in the following manner.

When a frontal collision of a vehicle is detected, the inflator 13 discharges gas, whereby the bag 12 (gas chamber 15) is inflated with the gas from the inflator 13. As a result, the front portion of the seat cushion is pushed upward or thrust upward from below. This increases the density, thereby inhibiting or suppressing forward movement of an occupant's waist.

Because the stationary sections 12a and 12a at both ends of the bag 12 are fixed to the seat pan 8 with the bolts 14, forward displacement of the bag 12 is prevented or suppressed even when a forward load is applied from the occupant towards the inflated bag 12.

In the occupant restraining device 10, the panels 16 and 17 are connected together by means of a combination of the elastic adhesive 19 and the seam 20, thereby achieving secure connection between the two panels. In addition, the elastic adhesive 19 allows for a gas seal effect. Consequently, the internal pressure of the inflated bag 12 is maintained at a high level for an extended period of time.

Figure 8:
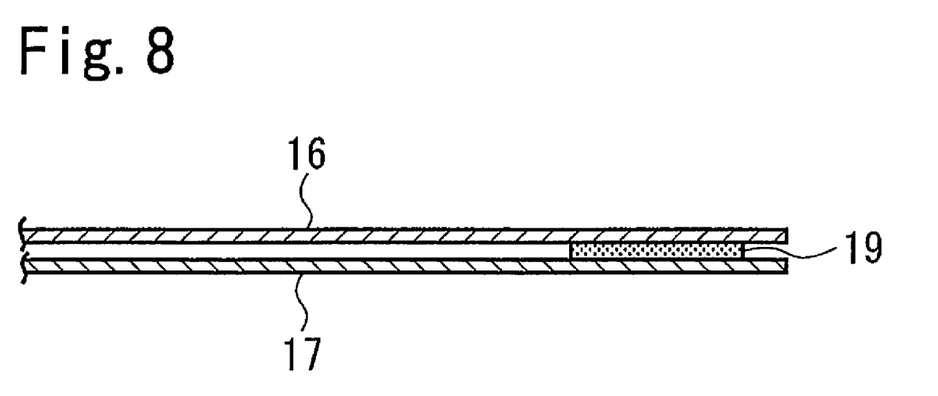
FIG. 8 is a partial cross-sectional view of a bag according to another embodiment.

Although the panels 16 and 17 are connected together by means of a combination of the elastic adhesive 19 and the seams 20 to 22 in this embodiment, the panels 16 and 17 may alternatively be connected together with only the adhesive 19, as shown in FIG. 8, if the adhesion of the adhesive 19 is sufficiently high to an extent that the panels 16 and 17 can be prevented from becoming detached from each other when the bag 12 is inflated. In that case, the adhesive 19 may be such that it is completely prevented from becoming detached at the time of inflation of the bag 12, or may be such that the adhesive 19 becomes detached near the gas chamber 15 of the bag 12 but maintains its adhesion for the panels 16 and 17 along the outer periphery of the bag at the time of inflation.

Figure 6:
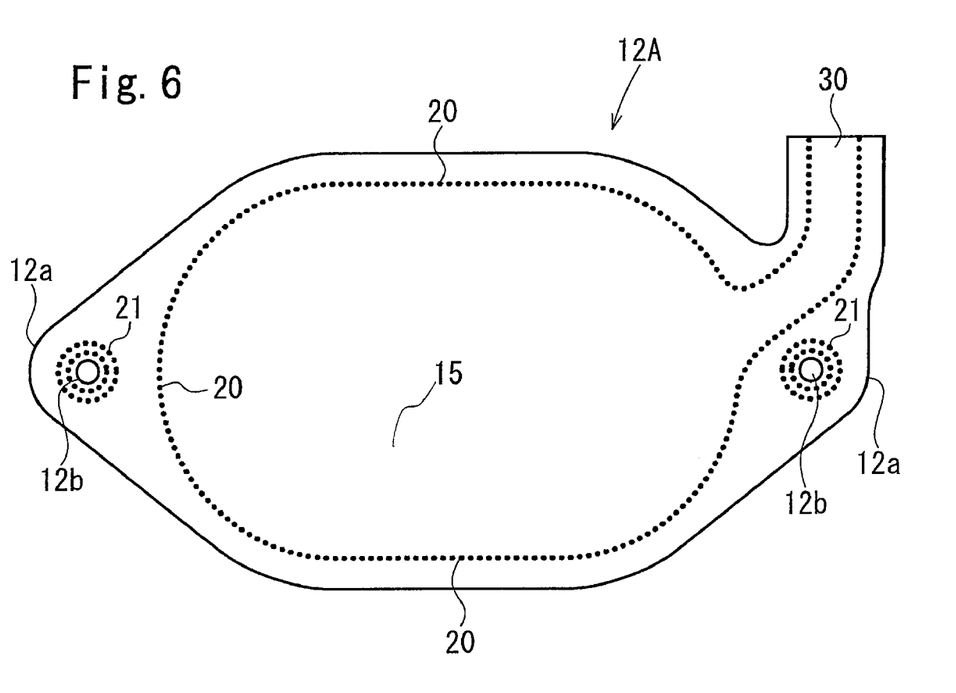
FIG. 6 is a plan view of a bag according to another embodiment.

Although the inflator 13 is disposed within the bag 12 in the above embodiment, the inflator may alternatively be disposed externally of the bag. FIG. 6 is a plan view showing an example of a bag in a case where an inflator is disposed externally of the bag.

A bag 12A in FIG. 6 has a hose-like duct 30 that extends from one longitudinal (left-right direction) end thereof (i.e. that extends from near one of the stationary sections 12a). A base end of the duct 30 communicates with the gas chamber 15. A gas-supplying member (such as a pipe) extending from the inflator is inserted through the duct 30, and is connected to the duct 30 with a band (not shown). Thus, the inflator disposed externally of the bag 12A supplies gas into the gas chamber 15 through the gas-supplying member and the duct 30.

The remaining elements of the bag 12A are substantially the same as those of the bag 12 shown in FIGS. 1 to 5. The reference numerals in FIG. 6 that are the same as those in FIGS. 1 to 5 indicate the same elements.

Figure 9:
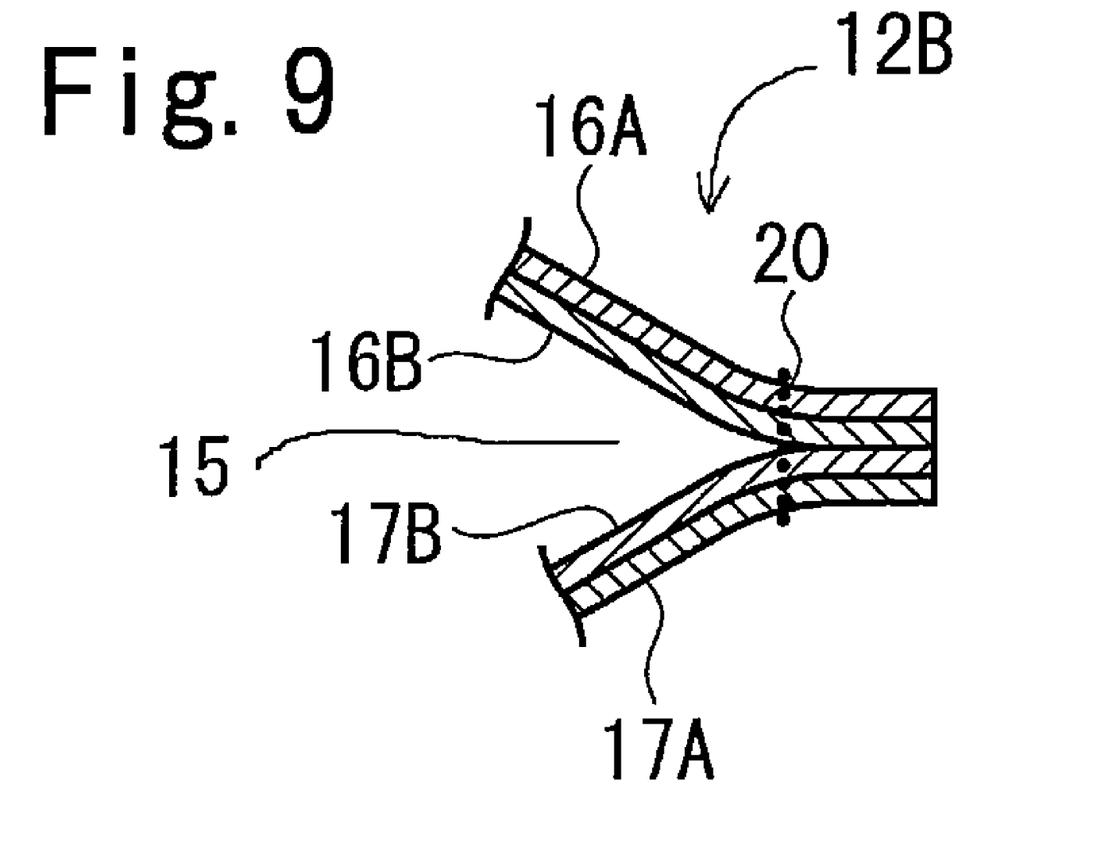
FIG. 9 is a partial cross-sectional view of a bag according to another embodiment.

In the present invention, a plurality of panels may be provided at each of upper and lower sides of the gas chamber as in a bag 12B shown in FIG. 9 (two panels 16A and 16B and two panels 17A and 17B are respectively provided at the upper and lower sides in FIG. 9). This allows for reduced stretchability of the panels 16 and 17, and thus enhances the tolerance of the bag. In addition, this configuration can suppress leakage of gas through the panels. The panels 16A to 17B may be of the same material or may be of different materials (such as materials having different stretchability).

Figure 10:
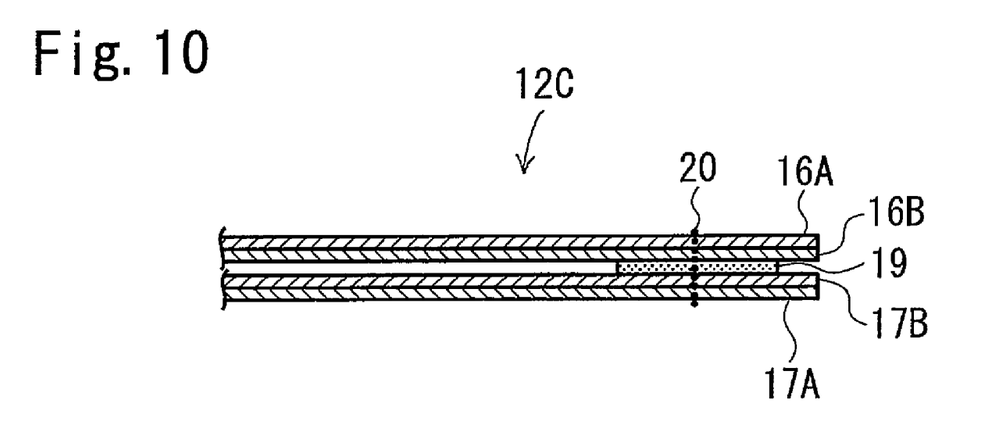
FIG. 10 is a partial cross-sectional view of a bag according to another embodiment.

Although FIG. 9 shows only one seam 20, a combination of the seam 20 and the elastic adhesive 19 may be applied as in a bag 12C shown in FIG. 10.

In the above case where a plurality of panels is used, the sheets of woven fabric constituting the panels may have their weave directions biased with respect to one another.

Figure 11:
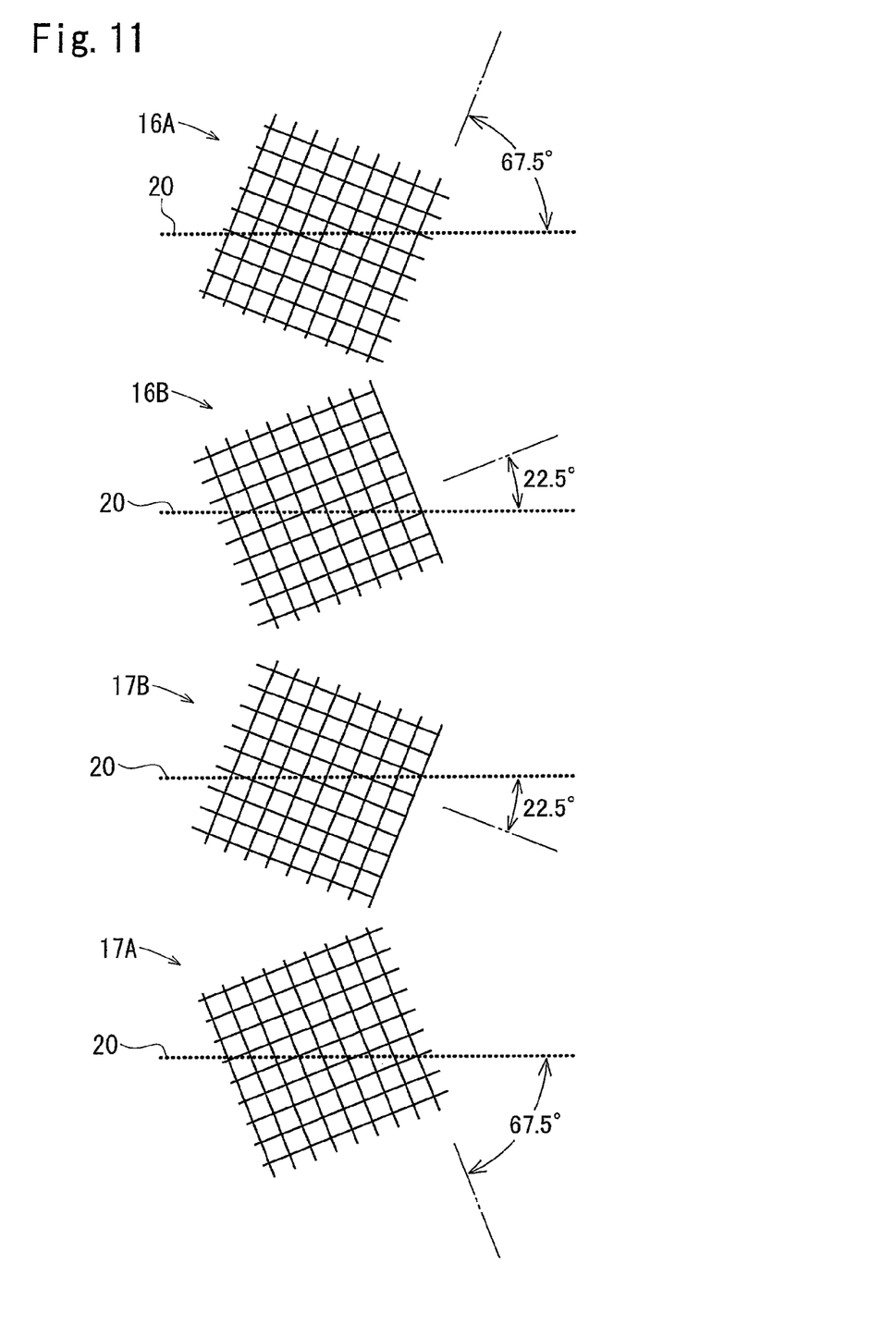
FIG. 11 illustrates weave directions of panels constituting the bag according to the embodiment shown in FIG. 10.

FIG. 11 illustrates panels 16A to 16D of a bag according to such an example and the seam. The weave directions of the panels 16A, 16B, 17B and 17A are biased with respect to one another by 45°. By setting the weave directions at different angles in this manner, a force imparted on the bag can be dispersed, whereby the stretchability can be uniformized in all directions as much as possible.

In this embodiment, since the extending direction of the seam 20 is biased with respect to every one of the weave directions of the panels, the thread at the seam portion is prevented from becoming displaced.

Figure 12:
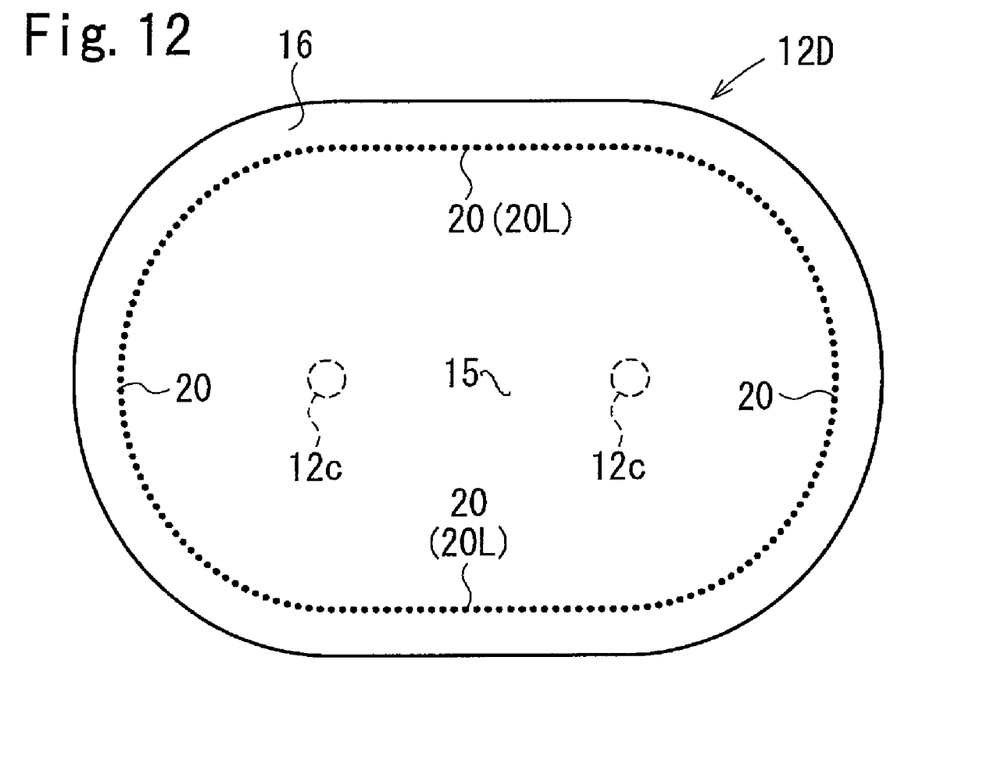
FIG. 12 is a plan view of a bag according to another embodiment.

In the above embodiment shown in FIGS. 1 to 5, the longitudinal ends of the bag 12 are fixed to the seat pan 8 with the bolts 14, and an intermediate portion of the bag 12 in the longitudinal direction thereof is fixed to the seat pan 8 by means of the retainer 18 (the stud bolts 18a) disposed within the bag 12. In the present invention, in such a case where a longitudinally intermediate portion of a bag is fixed to a seat pan by means of a fixing member, such as a retainer, the fixation of the longitudinal ends of the bag to the seat pan may be omitted. FIG. 12 is a plan view of a bag 12D having such a configuration.

The bag 12D in FIG. 12 has a configuration such that the stationary sections 12a and 12a at the longitudinal ends of the bag 12 in the embodiment shown in FIGS. 1 to 5 are removed. The inflatable gas chamber 15 within the bag 12D extends over substantially the entire length from one longitudinal end to the other end.

The remaining elements of the bag 12D are the same as those of the bag 12 in the embodiment shown in FIGS. 1 to 5. The reference numerals in FIG. 12 that are the same as those in FIGS. 1 to 5 indicate the same elements.

The longitudinally intermediate portion of the bag 12D is fixed to the seat pan 8 by means of the stud-bolt through-holes 12c and the retainer 18 (the stud bolts 18a) disposed within the bag 12D. On the other hand, the longitudinal ends of the bag 12D are not fixed to the seat pan 8.

However, the attachment structure of the bag 12 to the seat pan is not limited to that in each of the above embodiments. The bag may be attached to the seat pan by means of other attachment structures.

The above embodiments are only examples of the present invention, and the present invention is thus not limited to the above embodiments.

While the present invention has been described in detail with reference to specific embodiments, it is obvious to those skilled in the art that various modifications are permissible without departing from the scope and spirit of the invention.

The invention claimed is:

1. An occupant restraining device comprising:
   a vehicle seat having a seat pan for supporting a seat cushion thereon;
   an inflatable bag secured to the seat pan under the seat cushion and having a chamber into which gas is introduced, the bag being inflated as a result of the gas introduced into the chamber so as to push the seat cushion from below; and
   a gas generator that inflates the bag when a vehicle is in an emergency situation,
   wherein the bag includes two or more fabric panels disposed above the chamber and two or more fabric panels disposed below the chamber when the bag is inflated and connected to each other at least at edges thereof.

2. The occupant restraining device according to claim 1, wherein at least a part of the connection is bonded using elastic adhesive having a stretchability of 200% or more.

3. The occupant restraining device according to claim 2, wherein the connection includes a combination of the bonding with the adhesive and sewing of the bonded part.

4. The occupant restraining device according to claim 1, wherein a weave direction of at least a portion of one of the panels is biased with respect to a weave direction of at least a portion of another one of the panels.

5. The occupant restraining device according to claim 1, wherein weave directions of the vertically adjacent panels differ from one another by 40° to 50°.

6. An occupant restraining device comprising:
   an inflatable bag having a chamber into which gas is introduced, the bag being inflated as a result of the gas introduced into the chamber so as to push a seat cushion from below; and
   a gas generator that inflates the bag when a vehicle is in an emergency situation,
   wherein the bag includes a plurality of panels that are stacked and connected together to form the chamber between the panels,
   wherein each of the panels is formed of a woven fabric, and
   wherein the panels comprise two or more fabric panels disposed above the chamber and two or more fabric panels disposed below the chamber when gas is introduced therein to inflate the bag.

7. The occupant restraining device according to claim 6, wherein weave directions of the vertically adjacent panels differ from one another by 40° to 50°.

8. An occupant restraint device for a vehicle, the occupant restraint device comprising:
   an airbag having a chamber for being inflated during emergency conditions;
   an upper wall of the airbag including multiple fabric panel layers that are each of woven fabric material;
   a lower wall of the airbag including multiple fabric panel layers that are each of woven fabric material; and
   a seam of sewn threads that extend through the multiple fabric panel layers of both the upper and lower walls adjacent peripheral edges thereof for connecting the walls to form the airbag chamber with the multiple fabric panel layers of each wall minimizing leakage therethrough and out from the airbag chamber during inflation thereof without having adhesive between the upper and lower walls for connecting the walls together.

9. The occupant restraint device of claim 8 including a gas generator disposed in the chamber for supplying inflation gas into the chamber.

10. The occupant restraint device of claim 9 including a retainer disposed in the chamber to which the gas generator is mounted with the retainer having at least one elongate fastener, and wherein the lower wall has a through hole extending through the multiple panels thereof through which the elongate fastener extends for securing the gas generator to vehicle structure.

11. The occupant restraint device of claim 8 wherein the multiple panel layers of the upper wall comprise two panel layers and the multiple panel layers of the lower wall comprise two panel layers so that the sewn seam connects four panel layers of woven fabric material together at the peripheral edges of the walls.

12. The occupant restraint device of claim 8 in combination with a seat of the vehicle having a seat cushion and a seat pan on which the seat cushion is supported, and wherein the airbag is mounted on the seat pan under a front portion of the seat cushion to push the seat cushion front portion upwardly when the airbag is inflated.

13. The occupant restraint device of claim 12 wherein the airbag includes corner stationary sections fixed to the seat pan with the seam including curved sections adjacent the corner stationary sections of the airbag.

* * * * *